United States Patent [19]

Hillis et al.

[11] Patent Number: 5,202,979
[45] Date of Patent: Apr. 13, 1993

[54] STORAGE SYSTEM USING MULTIPLE INDEPENDENTLY MECHANICALLY-DRIVEN STORAGE UNITS

[75] Inventors: W. Daniel Hillis, Cambridge; Clement K. Liu, Brighton, both of Mass.

[73] Assignee: Thinking Machines Corporation, Cambridge, Mass.

[21] Appl. No.: 906,006

[22] Filed: Jun. 26, 1992

Related U.S. Application Data

[63] Continuation of Ser. No. 703,580, May 20, 1991, abandoned, which is a continuation of Ser. No. 431,709, Nov. 2, 1989, abandoned, which is a continuation of Ser. No. 732,353, May 8, 1985, abandoned.

[51] Int. Cl.$^5$ .............................................. G06F 7/22
[52] U.S. Cl. .................................. 395/575; 364/248.1; 364/DIG. 1; 364/265.5; 364/285; 395/425; 371/40.1
[58] Field of Search ............... 395/575, 425; 371/40.1

[56] References Cited

U.S. PATENT DOCUMENTS

| | | | |
|---|---|---|---|
| 3,417,377 | 12/1968 | Vietor et al. | 364/900 |
| 3,437,998 | 4/1969 | Bennett et al. | 340/172.5 |
| 3,568,160 | 3/1971 | Talarczyk | 340/172.5 |
| 3,840,864 | 10/1974 | Chang et al. | 340/172.5 |
| 3,876,978 | 4/1975 | Bossen et al. | 371/51 |
| 4,007,448 | 2/1977 | Sergeant et al. | 340/172.5 |
| 4,064,489 | 12/1977 | Babb | 364/200 |
| 4,092,732 | 5/1978 | Ouchi | 364/900 |
| 4,200,928 | 4/1980 | Allan et al. | 364/200 |
| 4,211,997 | 7/1980 | Rudnick et al. | 371/38 |
| 4,292,684 | 9/1981 | Kelly et al. | 371/38 |
| 4,308,557 | 12/1981 | Dieterich | 371/38 X |
| 4,413,317 | 11/1983 | Swenson | 364/200 |
| 4,413,340 | 11/1983 | Odaka et al. | 371/39 |
| 4,434,487 | 2/1984 | Rubinson et al. | 371/10 |
| 4,467,373 | 8/1984 | Taylor et al. | 371/38 X |
| 4,525,839 | 6/1985 | Nozawa | 371/38 |
| 4,527,273 | 7/1985 | Hibi et al. | 371/38 |
| 4,530,048 | 7/1985 | Proper | 364/200 |
| 4,817,035 | 3/1989 | Timsit | 364/900 |

FOREIGN PATENT DOCUMENTS 0117287 11/1983 European Pat. Off. .
0112676 12/1983 European Pat. Off. .
0156440 3/1985 European Pat. Off. .

OTHER PUBLICATIONS

Boral, et al., "Database Machines: An Idea Whose Time Has Passed? A Critique of the Future of Database Machines", *Database Machines*, Berlin 1983, pp. 166-187.

J. Smith, "Recovery From Transient Faults In Redundant Systems", *IBM Technical Disclosure Bulletin*, vol. 23, No. 4, Sep. 1980, pp. 1707-1709.

"Parallel Operation of Magnetic Disk Storage Devices: Synchronized Disk Interleaving", by Michelle Kim, In Database Machines, Fourth International Workshop, Grand Bahama Island, Bahama Islands, Mar. 1985, pp. 300-330.

Patterson, D. A., Gibson, G., Katz, R. H., "A Case for Redundant Arrays of Inexpensive Disks (RAD)", ACM SIGMOD Conference, Chicago, Ill., Jun. 1-3, 1988.

"Enhanced Small Device Interface Specification", Magnetic Peripherals, Inc., Jul., 1984, No. 77738076, pp. 1-93.

"Small Computer System Interface (SCSI)", American National Standard Publication, X3T9/84-40, X3T9.2/82-2, Revision 14B, Nov. 6, 1984.

"Samll Computer System Interface (SCSI)", American National Standard Publication, X3T9/84-40, X3T9.2/82-2, Revision 17B, Dec. 16, 1985.

*Primary Examiner*—Lawrence E. Anderson
*Attorney, Agent, or Firm*—David L. Feigenbaum; Richard A. Jordan

[57] ABSTRACT

A storage system for data words in which error correction bits are generated for each data word and are stored independently from the data word on a separate mechanically-driven medium. In another aspect, the storage system serves a wide high throughput parallel bus by storing different portions of each data word that appears on the bus in different asynchronous storage units.

18 Claims, 4 Drawing Sheets

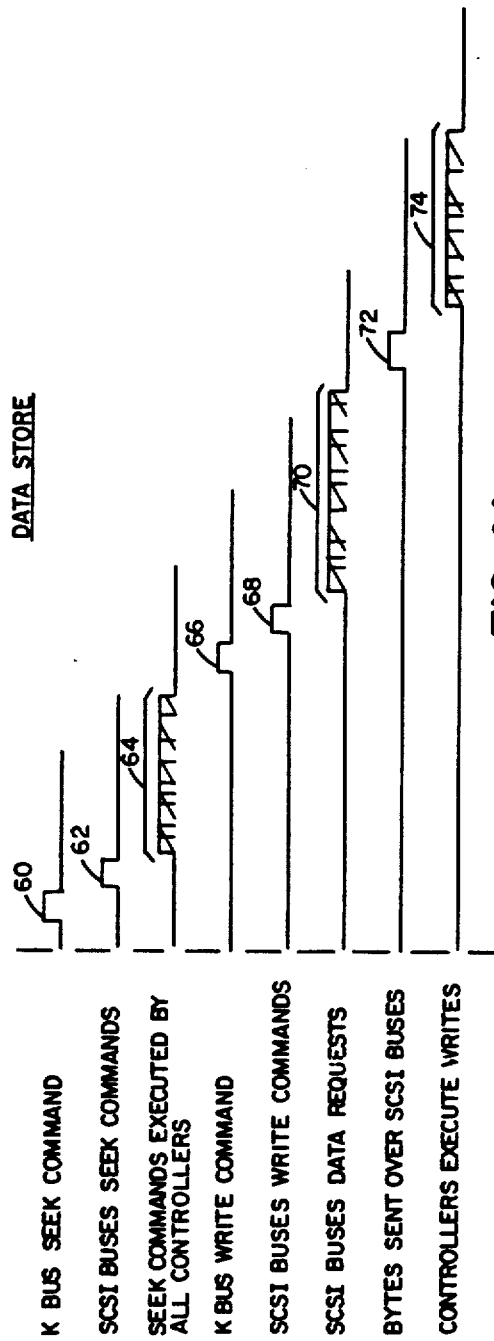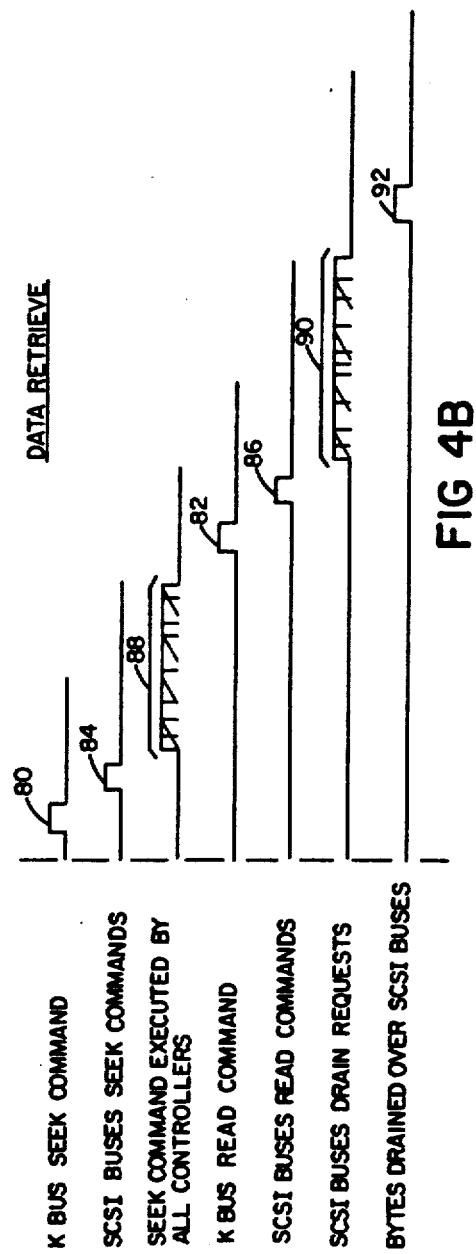

STORAGE SYSTEM USING MULTIPLE INDEPENDENTLY MECHANICALLY-DRIVEN STORAGE UNITS

This is a continuation of co-pending application Ser. No. 07/703,580, filed on May 20, 1991, now abandoned, which is a continuation of Ser. No. 07/431,709, filed on Nov. 2, 1989, now abandoned, which is a continuation of Ser. No. 06/732,353, filed on May 8, 1985, now abandoned.

BACKGROUND OF THE INVENTION

This invention relates to storing digital data on mechanically-driven storage media, such as magnetic disks.

In a typical magnetic disk drive, several hard magnetic disks are mounted on a single rotating spindle. The storage space on each disk surface is organized in concentric tracks. The corresponding tracks on all of the disk surfaces form an imaginary cylinder. Each disk surface is served by a read/write head. All of the read/write heads can be moved together to any selected cylinder and can then store or retrieve data on the tracks that make up that cylinder.

Normally the magnetic disk drive is connected by a serial bus to a disk controller that, among other things, directs the read/write heads to move to the proper track, buffers data that is about to be stored on or has just been retrieved from the disk, assures that the data is stored or retrieved at the proper address, and performs serial error correction and detection on the data. Typically the disk controller serves a parallel input/output bus connected to a computer whose input/output port is, for example, 32 bits wide. Thirty-two bit words delivered over the bus are passed via the disk controller and serially loaded onto or retrieved from the disk drive. The throughput rate of the serial bus between the disk controller and the disk drive is roughly matched to the throughput rate of the parallel I/O bus between the computer and the disk controller.

In order to expand the total available storage space, multiple disk driver can be linked to a single controller in a daisy chain or star configuration.

SUMMARY OF THE INVENTION

One general feature of the invention is in generating error correction bits for the data words and storing the correction bits independently from the data words on a separate mechanically driven medium.

Preferred embodiments of the invention include the following features. Different portions of each data word are stored in different data storage units and there is at least one correction bit storage unit for storing the correction bits. Errors are corrected in a manner that is tolerant to the failure of any single storage unit. Various ones of the error correction bits for a given data word are stored in different correction bit storage units (preferably with no two error correction bits for a given data word being stored in a single storage unit). A set of error correction bits are generated for a group of fewer than all of the bits in a data word at one time and groups of the data word bits are processed in succession to produce successive sets of error correction bits. Alternatively, the different groups of data word bits are processed in parallel at the same time to generate the sets of error correction bits. For example, each data word could have 64 bits making up two groups of 32 bits each, and a set of 7 correction bits could be generated for each group of 32 bits. The data words are delivered in succession via a parallel data bus for storage and retrieval, and there is an adaptor connected between the bus and the storage units to route the data words between the bus and the storage units.

Another general feature of the invention is to store different portions of each data word that appears on the parallel bus in different asynchronous mechanically driven storage units.

Preferred embodiments of the invention include the following features. A data word is retrieved by delaying the delivery of any portion of the data word to the bus until all portions of the data word are ready to be delivered. Each storage unit sends a drain command when it is ready to deliver its portion of the requested data word, and the storage units are drained only when all storage units have issued drain commands. Parallel error correction bits are generated for each data word and at least one of the error correction bits is stored on a storage unit that does not hold any portion of the related data word. The error correction bits are read at times corresponding to the reading of the data word and are used for correcting single bit errors in the data word. When storing data words, the different portions of the data word are not delivered to the different storage units until they are all ready to store. Each storage unit has a buffer and successive data words to be read out are requested at a rate sufficient to assure that no buffer becomes full; and successive words to be written are delivered at a rate sufficient to assure that no buffer becomes empty. Equal numbers of bits (e.g., 2 bits) of each data word are stored in different storage units. Each individual bus serving a storage unit conforms to the SCSI protocol. There are more than 32 bits (e.g., 256 bits) in each data word. The data words are delivered to the parallel bus at a rate of at least 4 megabits per second per line of the bus. Each storage unit is a magnetic disk drive.

The invention provides a very high throughput rate storage system capable of serving a very wide, high-speed parallel I/O bus. Standard commercially available disk drives and controllers can be used without having to synchronize the rotations of the different disk drive spindles. By storing error correction bits and data bits independently, the system is tolerant to the failure of any one entire disk drive unit. Standard SCSI protocol commands are used to synchronize the overall operation of the system.

Other advantages and features of the invention will become apparent from the following description of the preferred embodiment, and from the claims.

DESCRIPTION OF THE PREFERRED EMBODIMENT

We first briefly describe the drawings.

Drawings

FIGS. 4A and 4B are timing diagrams of data store and data retrieve operations.

STRUCTURE AND OPERATION

Figure 1:
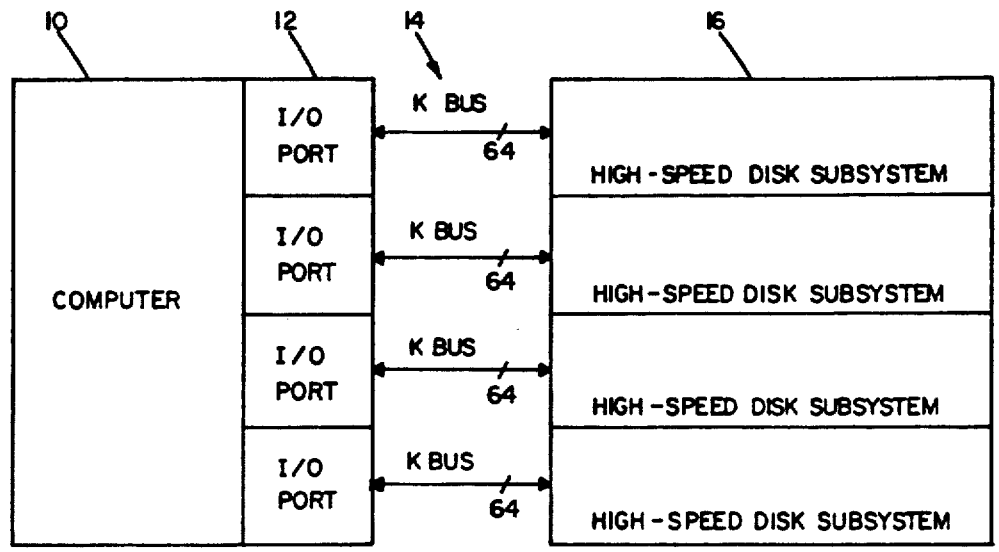
FIG. 1 is a block diagram of a computer and related storage system.

Referring to FIG. 1, a computer 10 (of the kind described in United States patent application, Ser. No. 499,474, filed May 31, 1983, and in U.S. Pat. No. 4,709,307 issued Nov. 24, 1987 assigned to the same assignee as this application, and incorporated herein by reference) has four identical input/output (I/O) ports 12. Each I/O port 12 is connected via a 64-bit wide parallel bus 14 (KBUS) to a corresponding high-speed disk subsystem 16 for storing data received over the KBUS, and for delivering retrieved data to the KBUS. Each KBUS has a throughput rate of 32 megabytes per second (8 bits per byte); data can be passed over all four KBUSes synchronously at an aggregate throughput rate of 128 megabytes per second.

Figure 2:
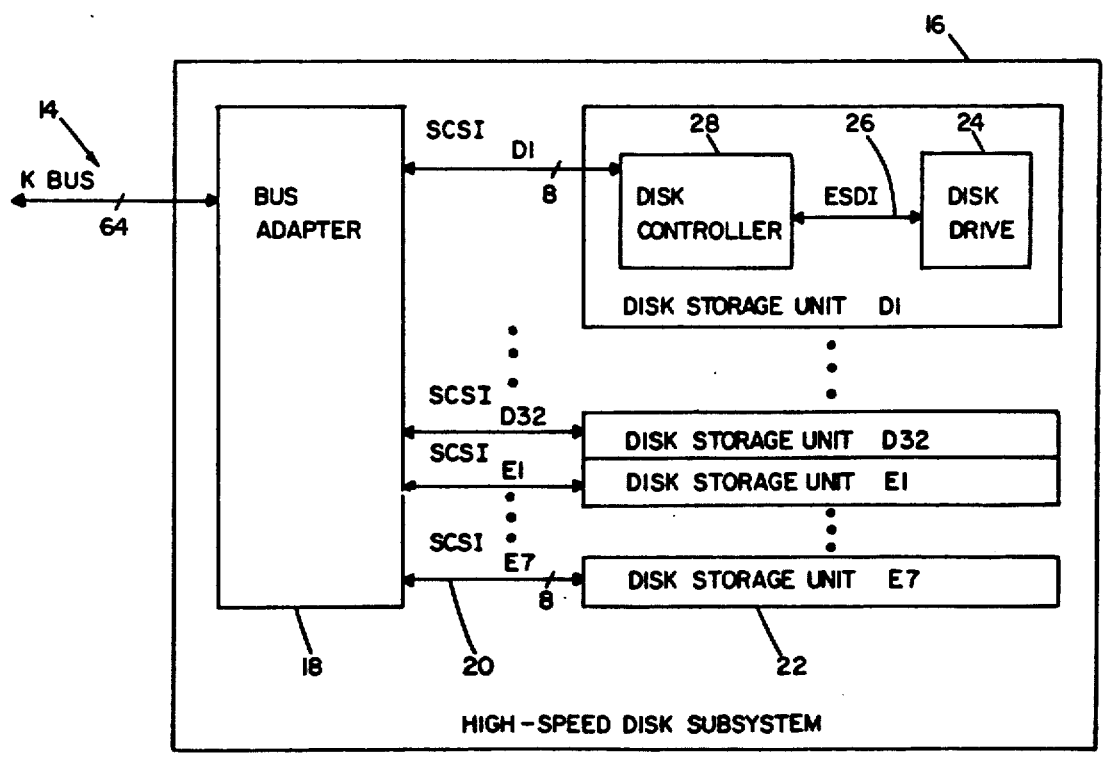
FIG. 2 is a block diagram of one high-speed disk subsystem of FIG. 1.

Referring to FIG. 2, each disk subsystem 16 includes a bus adapter 18 connected to one of the KBUSes. The bus adaptor 18 is also connected via 39 different parallel buses 20 (SCSI L buses), each 8-bits wide, to 39 different disk storage units 22. Each disk storage unit 22 includes a disk drive 24 (e.g., Control Data Model 9415) connected via a serial bus 26 (ESDI bus) to a disk controller 28 (e.g., Champion model sold by Emulex) which is in turn connected to the SCSI bus that serves that disk storage unit. Each SCSI bus carries data and commands (in the form of command descriptor blocks—CDBs) in accordance with the Small Computer System Interface standard defined in U.S. Department of Commerce, National Bureau of Standards Publication X3T9 2/82-2, Revision 14B, Nov. 6, 1984, incorporated herein by reference.

The 39 disk storage units and the 39 SCSI buses are organized into two groups. Thirty-two of the disk storage units and buses (denoted D1 through D32) are used to store and deliver data from computer 10. The remaining 7 disk storage units and buses (denoted E1 through E7) are used to store and deliver error correction bits that are derived from the data bits in a manner to be described below, and are used for error correcting. Except for this distinction in the type of information they carry, all 39 disk storage units and SCSI buses are identical.

Each ESDI bus carries data and commands serially in accordance with the Enhanced Small Device Interface defined for example in Magnetic Peripherals, Inc. publication 77738076-D, 1984, incorporated herein by reference.

Figure 3:
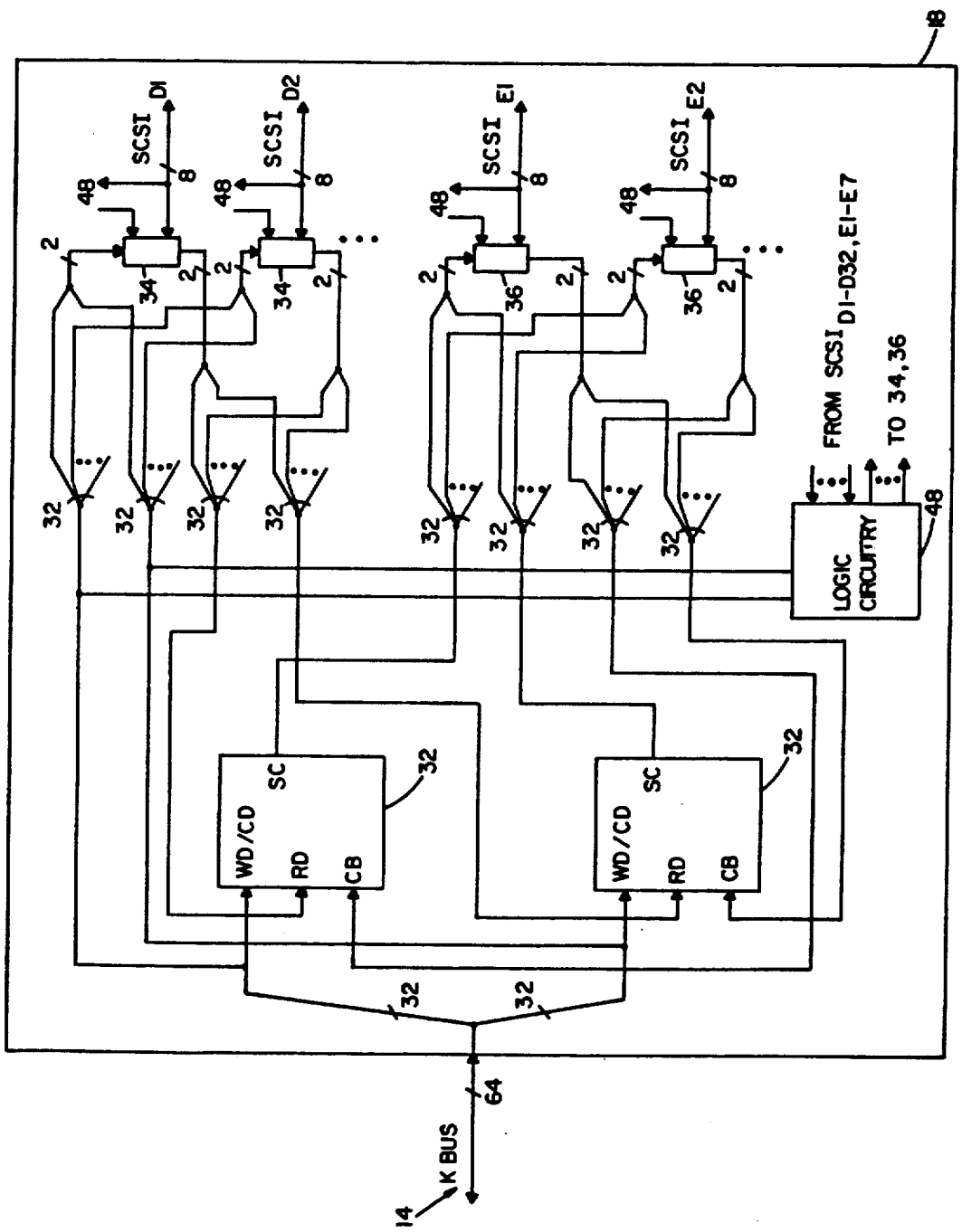
FIG. 3 is a block diagram of a representative portion of the bus adaptor circuitry of FIG. 2.

Referring to FIG. 3, in each bus adaptor 18, the 64 lines of the KBUS are split into two sets of 32 lines each, the two sets being connected respectively to the bidirectional WD/CD inputs (write data or corrected data) of two error detection and correction units 32 (each unit comprising, for example, a pair of Intel 8206 or AMD 2960 chips). The 32 lines connected to each WC/CD input are also connected respectively to the inputs of 32 eight bit shift registers 34. Each shift register thus has its two bit input connected to one line from each of the two sets of 32 lines, and each shift register is arranged to shift two bits at a time.

For each set of 32 data bits applied to the WD/CD input of each unit 32, the unit generates seven parallel error correction bits that provide information sufficient to correct any single bit error in any of the related 32 data bits that occur during subsequent retrieval of those bits.

The seven error correction bits of each unit 32 are delivered from the SC output via seven error correction bit lines that are connected respectively to the inputs of seven eight-bit shift registers 36 that are like registers 34.

After one transfer cycle of the KBUS has elapsed, each shift register 34 contains 2 data bits corresponding to the data bits appearing on two of the lines of the KBUS, and each shift register 36 contains two of the corresponding error correction bits. After four transfer cycles of the KBUS have elapsed, each shift register 34 contains 8 data bits (one data byte) and each shift register 36 contains 8 error correction bits (one error correction byte). At that time the bytes in the shift registers 34, 36 are unloaded respectively onto SCSI buses $D_1$–$D_{32}$ and $E_1$–$E_7$. Then the process is repeated for the next four transfer cycles of the KBUS, and so on. The loading and unloading of the shift registers 34, 36 are timed so that data that appears at 32 megabytes per second on the KBUS (4 megabits per line) is delivered to 32 of the 8-bit wide SCSI buses at a rate of 1.5 megabytes per second per SCSI bus. Conversely data that appears at 1.5 megabytes per second per SCSI bus is delivered to the KBUS at 32 megabytes per second.

When data is retrieved from the disk drives 24, in each byte transfer cycle of the SCSI buses, one eight bit byte is loaded in parallel into each shift register 34, 36. Next, all of the shift registers 34 together unload the first and second bits of their error correction bytes in parallel to the RD (read data) inputs of EDC units 32, and all of the shift registers 36 unload the first and second bits of their data bytes in parallel to the CB (check bit) inputs of EDC units 32. EDC units 32 uses the error correction bits received via their CB inputs to check and correct any single bit error appearing in the data bits received at their RD inputs. EDC units 32 then deliver the 64 corrected data bits at their WD/CD outputs to the KBUS. The process is repeated until all eight bits of the bytes held in shift registers 34, 36 are unloaded. Then the shift registers are reloaded with new bytes from the SCSI buses.

Each disk controller 28 (FIG. 2) is arranged to control the storage and retrieval of data on disk drive 24 as follows.

To initiate a storage operation, computer 10 sends an appropriate command descriptor block (CDB) over the KBUS indicating that a specified number of bytes (word count) are to be stored beginning at a specified disk address. The CDB is passed by bus adaptor 18 via the SCSI bus to disk controller 28. The controller will then, if necessary, send a seek command over the ESDI bus to the disk drive to cause it to move the read/write heads to the cylinder containing the storage location whose address was specified in the CDB. The controller 28 will next request that the data to be stored be delivered over the SCSI bus. The request is passed back to the computer via the KBUS. The data is then passed over the KBUS via the bus adaptor to the SCSI bus (as previously described) and as the data bits are received they are stored in a 14 kilobyte buffer in the controller. Since each track has a capacity of about 10 kilobytes, the buffer is able to hold more than a full track worth of data at one time. The disk controller 28 will begin to unload its buffer serially onto the ESDI bus either when the buffer is full (if the word count is greater than or equal to the buffer capacity), or otherwise as soon as the number of bytes in the buffer equals the word count. The data is then stored beginning at the specified address on the track. If the word count is greater than the capacity of the buffer, then as soon as the buffer has been drained to a level where only 8 kbytes of data remain in the buffer, the controller sends a request for additional data back to computer 10 and the additional data is loaded into the buffer at the same time that the oldest data in the controller is being unloaded to disk drive 24. The process continues until the word count has been reached.

Similarly, to initiate a retrieval operation, computer 28 sends a CDB indicating that a specified number of bytes are to be retrieved beginning at a specified disk address. The controller will first, if necessary, cause the disk drive read/write heads to seek to the proper track, and to read data beginning at the designated address. The data passes serially over the ESDI bus and is loaded into the controller's serial buffer. As soon as the buffer contains a number of bytes equal to the number of bytes in a sector of the track, the controller will send a request over the SCSI bus to computer 10 to take the data from the buffer. While that data is being unloaded, the controller continues to accept data over the ESDI bus from the disk drive and to load it into its buffer. The process continues until the number of bytes equals the word count.

The storage and retrieval of data via all of the SCSI buses to the controllers occurs synchronously in parallel. That is, from the point of view of the bus adaptor, related data is passed in a single operation over all of the SCSI buses at the same time. Since the different disk drives 24 are typically rotating out of phase with one another, it is unlikely that the corresponding track locations on different disk drives will appear under their respective read/write heads at the same time. Accordingly there will be differences in the times when different controllers are able to execute storage commands, and differences in the times when different controllers will be ready to deliver retrieved data. The potentially out-of-phase operation of the different controller is reconciled with the need for synchronous transfers to and from the bus adaptor in the following way.

Referring to FIG. 4A, when data is to be stored, computer 10 first sends to the bus adaptor a seek command (60) naming a particular cylinder. The bus adaptor then broadcasts the seek command by passing appropriate CDBs via the SCSI buses to all of the controllers (62) to cause them all to seek to the same cylinders. While the controllers are independently executing the seek commands, the computer can perform other unrelated operations.

After passage of a period of time (64) which is sufficient to assure that all controllers have executed the seek command, computer 10 sends a write command (including the associated disk address and word count such that a cylinder boundary is not crossed) to the bus adaptor (66). The bus adaptor broadcasts the write command to all controllers (68) by passing appropriate CDBs via the SCSI buses to all of the controllers. The controllers will then all initiate a series of requests (70) over the SCSI buses on a byte-by-byte basis to the bus adaptor for the data that is to be stored. The data requests from different controllers typically will not appear synchronously. The bus adaptor includes logic circuitry 48 that is connected to all of the SCSI buses and will detect the requests as they appear. Logic circuitry 48 also has control outputs connected to control inputs of the respective shift registers 34, 36 to control the loading and unloading of the shift registers via the SCSI buses.

When all of the controllers have issued their requests, the bus adaptor will satisfy all requests simultaneously by sending unload signals from logic circuitry 48 to all shift registers 34, 36 to cause them to unload their bytes over all of the SCSI buses at the same time (72). Each controller will continue to request data byte-by-byte until its buffer is full (or until the number of bytes in its buffer equals the word count). Each controller will then begin to write the data from its buffer onto the disk (74).

The different controllers will execute the write operations at asynchronous times which depend on the phase differences between the shaft locations of their respective disk drives. In the case when the word count exceeds the buffer capacity, as soon as the number of bytes remaining in its buffer falls below 8 kilobytes, each controller will request more data from the bus adaptor. These controller requests for more data typically will arrive asynchronously at the bus adaptor. The bus adaptor through its logic circuitry 48 will wait until all requests have been received before honoring them by delivering more bytes. In effect, the bus adaptor waits until the buffer in the controller which is the last to request more data, is drained to the 8 kilobyte level. Meanwhile, the buffer in the controller which was the first to request more data has been emptied below the 8 kilobyte level. Thereafter the bus adaptor will be delivering data bytes as soon as the first-to-request controller asks for them, thus assuring that the buffer in the first-to-request controller is never fully emptied. The process continues until the number of data bytes delivered to each controller reaches the word count.

Referring to FIG. 4B, when data is to be retrieved, computer 10 sends a seek command (80) followed by a read command (82) both of which are broadcast by the bus adaptor to the controllers (84, 86) in a similar manner as for the data storage operation. Each controller will execute the seek command (88) and will begin to execute the read command by causing the disk drive to read bytes from the disk and to deliver them serially over the ESDI bus to be loaded in the controller buffer. The different controllers will typically execute the reading of data asynchronously. When a sector's worth of read data has been entered into the buffer, the controller will ask to have the buffer drained (90), but will continue the data reading and buffer filling. When the bus adaptor logic circuitry detects that all controllers are waiting to have their buffers drained, it begins draining them (92). Thereafter the bus adaptor will keep draining bytes from the controller buffers at the rate requested by the controller which was the first-to-request draining, thus assuring that the first buffer is never full. The read operation continues until the number of bytes read from each disk drive equals the word count.

Should any one of the disk storage units 22 in each high-speed disk subsystem fail, the EDC unit will be able to correct erroneous bits received from the failed unit. The entire failed unit can then be replaced by a working unit without interrupting the operation of the disk subsystem.

The invention provides a very high throughput rate storage system capable of serving a very wide, high-speed parallel I/O bus. Standard commercially available disk drives and controllers can be used without having to synchronize the rotations of the different disk drive spindles. The system is tolerant to the failure of one entire disk drive unit. Standard SCSI protocol commands are used to synchronize the overall operation of the system.

Other embodiments are within the following claims.

Figure 5:
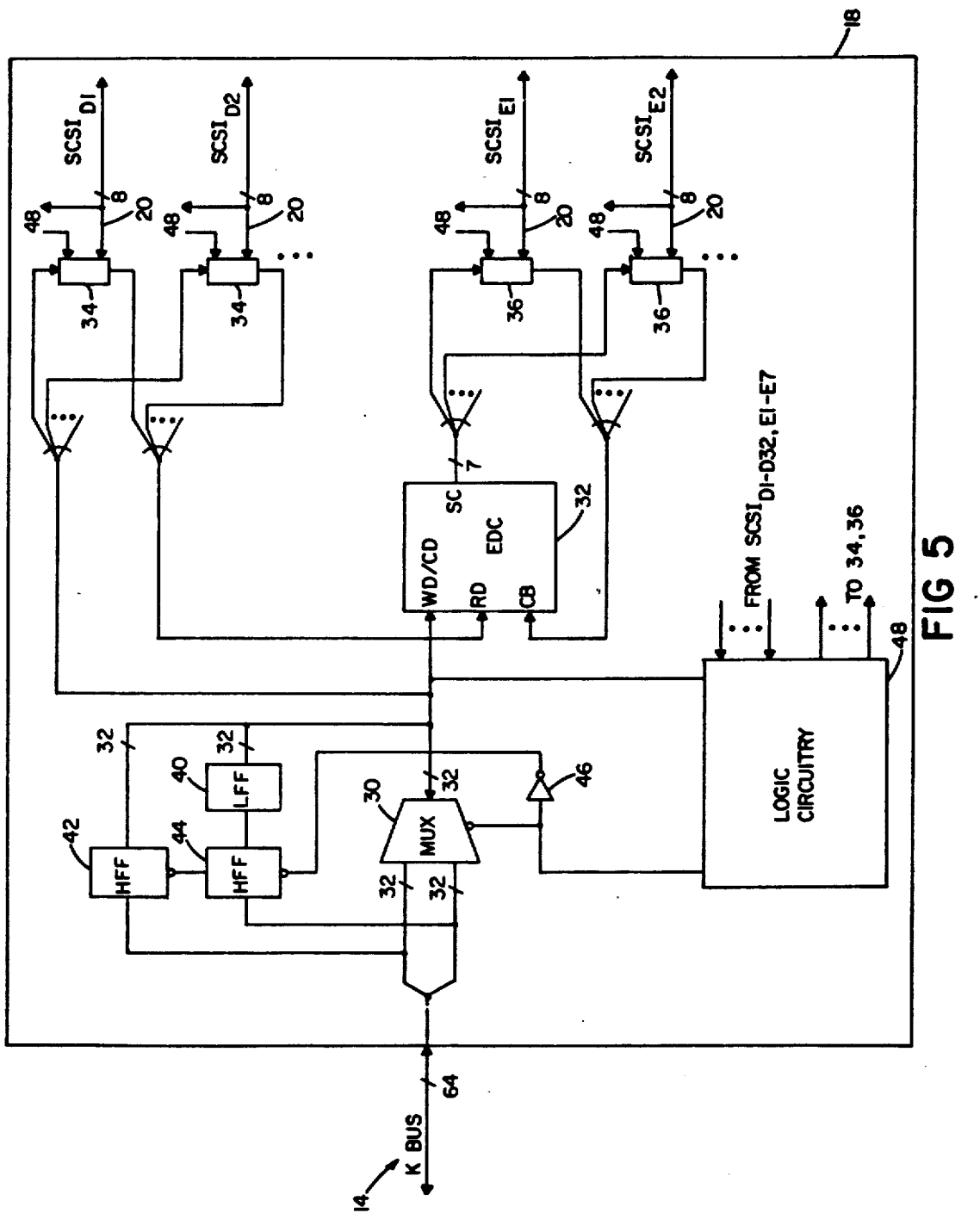
FIG. 5 is alternate circuitry to FIG. 3.

For example, referring to FIG. 5, the bus adaptor 18 could use a single EDC unit 32. In that case, the 64 lines of the KBUS are split into two sets of 32 lines each, both sets of which are connected to a multiplexer 30. When data is to be stored, multiplexer 30, during a single transfer cycle of the KBUS, first connects one set of 32 lines of the KBUS to the bidirectional WD/CD input of unit 32 and then connects the other set of 32 KBUS lines to the WD/CD input. The 32 lines connected to the WC/CD input are also connected respectively to the inputs of 32 eight-bit shift registers 34. During data retrieval, unit 32 delivers the 32 corrected data bits at the WD/CD output to a bank of 32 flip-flops (LFF) 40. Next the shift registers 34, 36 unload the second bits of their bytes to EDC unit 32, which in turn delivers the 32 corrected bits to a bank of flip-flops (HFF) 42. At the same time the bank of flip-flops 40 shifts its 32 bits to a third bank of 32 flip-flops (HFF) 44. Then a KBUS transaction will deliver all 64 bits to the computer. Inverter 46 assures that, when the computer is driving the KBUS, multiplexer 30 is active but banks 42, 44 are inactive, and otherwise multiplexer 30 is inactive and banks 42, 44 are able to deliver bits to the KBUS.

The input to inverter 46 is provided from logic circuitry 48 based on monitoring of the data bits passing back and forth to and from EDC unit 32. Circuitry 48 determines when it is appropriate to trigger the flip flop banks based on the appearances of the successive sets of 32 bits.

The number of KBUS lines served by each disk storage unit could be more or less than two.

What is claimed is:

1. A system for storing digital data words, each data word having a plurality of multi-bit data portions, and for delivering said data words in succession to a parallel data bus in response to a retrieval request, said system comprising:
   A. a plurality of data storage units each having a mechanically driven medium, said media of said different storage units being driven independently of each other, said data storage units storing data words with each data storage unit storing in parallel a respective one of said multi-bit data portions for each data word;
   B. at least one correction bit storage unit including a storage medium that is mechanically driven independently from the mechanically-driven media on which said data word is stored, for storing an error correction code associated with said data words, and
   C. an adapter connected to said parallel data bus, said data storage units and said correction bit storage unit for, in response to a retrieval request, (i) enabling said data storage units to contemporaneously retrieve respective data portions of selected data words and said correction bit storage unit to the retrieve error correction codes associated with said selected data words contemporaneously with the retrievals by said data storage units, (ii) assembling said respective data portions into said selected data words and (iii) use the associated error correction codes to perform an error detection and correction operation with respect to each said selected data word to determine whether it is correct and if not to generate a respective corrected data word, and (iv) thereafter to transmit the selected data words over said parallel data bus.

2. A system as defined in claim 1 in which the correction bit storage unit stores error correction bits such that, if a data storage unit fails, the adapter can, while performing an error detection and correction operation with respect to each of said selected data words, determine a value for the data portion stored on the failed data storage unit.

3. A system as defined in claim 1 in which each error correction code includes a plurality of multi-bit code portions and said system includes a corresponding number of correction bit storage units each for storing one of said code portions, said adapter (i) enabling said correction bit storage units to contemporaneously retrieve code portions associated with the selected data words, the retrieval by said correction bit storage units taking place contemporaneously with the retrieval by said data storage units of the data portions of the selected data words and (ii) using the retrieved code portions as the error correction codes in the error detection and correction operation.

4. A system as defined in claim 1 in which said adapter includes:
   A. storage unit interface for enabling said data storage units to contemporaneously retrieve respective data portions of selected data words and said correction bit storage unit to the retrieve error correction codes associated with said selected data words contemporaneously with the retrievals by said data storage units;
   B. a data word assembler for assembling said respective data portions retrieved by said storage unit interface into said selected data words;
   C. an error correction code check portion for, for each data word assembled by said data word assembler, using the associated error correction codes to perform an error detection and correction operation with respect to each said selected data word to generate a corrected selected data word, said corrected selected data word corresponding to said selected data word if the error correction code check portion determines that the selected data word is correct; and
   D. a data bus interface for transmit the corrected selected data words generated by said error correction code check portion over said parallel data bus.

5. A system as defined in claim 4 in which each error correction code includes a plurality of multi-bit code portions and said system includes a corresponding number of correction bit storage units each for storing one of said code portions, said storage unit interface enabling said correction bit storage units to contemporaneously retrieve code portions associated with the selected data words, the retrieval by said correction bit storage units taking place contemporaneously with the retrieval by said data storage units of the data portions of the selected data words and said error correction code check portion using the retrieved code portions as the error correction codes in the error detection and correction operation.

6. A system as defined in claim 4 in which said storage unit interface receives from each said data storage unit storage words each comprising a predetermined number of said data portions, said data word assembler assembling from respective data portions of storage words received from all of said storage units a plurality of data words.

7. A system as defined in claim 1 in which each of said data storage units and said correction bit storage unit includes an arrangement for writing onto their respective storage media, said adapter further in response to a storage request including data words, each data word including a plurality of multi-bit portions, (i) generating an error correction code for each data word, (ii) dividing each data word into a plurality of multi-bit portions, and (iii) transmitting said multi-bit portions and error correction code to respective data storage units and said correction bit storage unit for storage.

8. A system as defined in claim 7 in which the adapter generates correction bits for storage in said bit storage unit such that, if a data storage unit fails, the adapter can, while performing an error detection and correction operation with respect to each of said selected data words, determine a value for the data portion stored on the failed data storage unit.

9. A system as defined in claim 6, said adapter generating said error correction code as a plurality of multi-bit code portions and said system includes a number of correction bit storage units each for storing one of said code portions, said adapter transmitting said code portions to respective correction bit storage units contemporaneously.

10. A system as defined in claim 6 in which:
A. said data but interface further receives storage requests and data from said parallel bus;
B. said storage unit interface transmits data word portions and error correction codes to respective data storage units and said correction bit storage unit for storage; and
C. said adapter further includes:
  (i) an error correction code generator for generating an error correction code for each data word to be stored, and transferring said error correction code to said storage unit interface for transfer to said correction bit storage unit for storage; and
  (ii) a data word dividing circuit for dividing each data word into a plurality of multi-bit portions and transferring said data word to said storage unit interface for transfer to said data storage units for storage.

11. A system as defined in claim 10 in which said storage unit interface transmits to each said data storage unit storage words each comprising a predetermined number of said data portions, said data word dividing circuit forming storage words each to be transmitted to a storage unit from a plurality from respective data portions of a plurality of data words.

12. A system as defined in claim 10 in which each error correction code includes a plurality of multi-bit code portions and said system includes a corresponding number of correction bit storage nits each for storing one of said code portions, said error correction code generator including an error correction code dividing circuit for dividing each error correction code generated thereby into respective code portions for transfer to said storage unit interface, said storage unit interface transferring said code portions to respective correction bit storage units for storage.

13. A system for storing digital data words, each data word having a plurality of multi-bit data portions, and for storing said data words in response to a storage request received over a parallel data bus, said system comprising:

A. a plurality of data storage units each having a mechanically driven medium, said media of said different storage units being driven independently of each other, said data storage units storing data words with each data storage unit storing in parallel a respective one of said multi-bit data portions for each data word, each data storage unit including an arrangement for writing data portions onto its respective storage media,
B. at least one correction bit storage unit including a storage medium that is mechanically driven independently from the mechanically-driven media on which said data word is stored, for storing an error correction code associated with said data words, said correction bit storage unit including an arrangement for writing correction bits onto its storage media, and
C. an adapter connected to said parallel data bus, said data storage units and said correction bit storage unit for, in response to a storage request, (i) generating an error correction code for each data word, (ii) dividing each data word into a plurality of multi-bit portions, and (iii) transmitting said multi-bit portions and error correction code to respective data storage units and said correction bit storage unit for storage.

14. A system as defined in claim 13 in which the adapter generates correction bits for storage in said bit storage unit such that, if a data storage unit fails, the adapter can, while performing an error detection and correction operation with respect to each of said selected data words, determine a value for the data portion stored on the failed data storage unit.

15. A system as defined in claim 14 said adapter generating said error correction code as a plurality of multi-bit code portions and said system includes a number of correction bit storage units each for storing one of said code portions, said adapter transmitting said code portions to respective correction bit storage units contemporaneously.

16. A system as defined in claim 14 in which said adapter includes:
A. a data bus interface for receiving storage requests and data from said parallel bus;
B. a storage unit interface for transmitting data word portions and error correction codes to respective data storage units and said correction bit storage unit for storage; and
C. an error correction code generator for generating an error correction code for each data word to be stored, and transferring said error correction code to said storage unit interface for transfer to said correction bit storage unit for storage; and
D. a data word dividing circuit for dividing each data word into a plurality of multi-bit portions and transferring said data word to said storage unit interface for transfer to said data storage units for storage.

17. A system as defined in claim 16 in which said storage unit interface transmits to each said data storage unit storage words each comprising a predetermined number of said data portions, said data word dividing circuit forming storage words each to be transmitted to a storage unit from a plurality from respective data portions of a plurality of data words.

18. A system as defined in claim 16 in which each error correction code includes a plurality of multi-bit code portions and said system includes a corresponding number of correction bit storage units each for storing one of said code portions, said error correction code generator including an error correction code dividing circuit for dividing each error correction code generated thereby into respective code portions for transfer to said storage unit interface, said storage unit interface transferring said code portions to respective correction bit storage units for storage.

* * * * *